F. S. VALENTINER.
PROCESS OF MANUFACTURING NITRIC ACID.
APPLICATION FILED MAR. 30, 1907.
920,224.
Patented May 4, 1909.
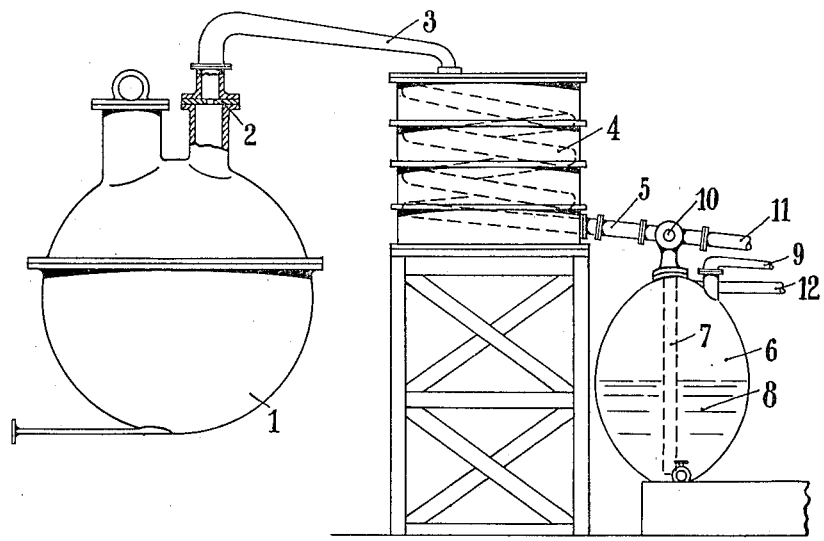
Witnesses:
Inventor:
FRIEDRICH SAMUEL VALENTINER,
BY
Attorneys.

UNITED STATES PATENT OFFICE.

FRIEDRICH SAMUEL VALENTINER, OF LEIPZIG-PLAGWITZ, GERMANY, ASSIGNOR TO THE FIRM OF VALENTINER AND SCHWARZ, OF LEIPZIG-PLAGWITZ, GERMANY.

PROCESS OF MANUFACTURING NITRIC ACID.

No. 920,224.  Specification of Letters Patent.  Patented May 4, 1909.

Application filed March 30, 1907. Serial No. 365,486.

*To all whom it may concern:*

Be it known that I, FRIEDRICH SAMUEL VALENTINER, a subject of the Emperor of Germany, and resident of Leipzig-Plagwitz, Germany, have invented a certain new and useful Improvement in Processes of Manufacturing Nitric Acid, of which the following is a specification.

This invention relates to a process of obtaining very highly concentrated and perfectly pure nitric acid in a short time.

It has been shown that the decomposition of nitrate of sodium or other nitrates in a vacuum or in rarefied air takes place much more rapidly when provision is made for surrounding the nitrate of sodium on all sides during the entire operation with the quantity of sulfuric acid necessary for the decomposition.

In the production of nitric acid according to vacuum processes heretofore in use there was a certain vacuum throughout the entire apparatus. On this account the disadvantage was experienced that the nitrate of sodium remained floating on the sulfuric acid, and therefore a slower distillation took place. Experiments have shown that the distillation can be effected more rapidly by working with increased pressure in the retort, say with a pressure exceeding that of the atmosphere by an amount equivalent to a column of mercury of 150 mm. or less, but with rarefied air in the condenser at about 610 mm. vacuum. For this purpose the nitric acid gases evolved are throttled at the point where they leave the retort on their way to the condenser, the passage being at this point half the diameter of the condensation coil. The gases evolved during the distillation do not pass freely through the constriction and therefore cause the nitrate of sodium to remain immersed in the sulfuric acid, while there is a vacuum in the condenser. The action of the sulfuric acid on the nitrate of sodium under pressure is much more energetic than in a vacuum and the time required for the distillation process is considerably reduced. The throttled gases pass into a cooling coil in which they are partly condensed, the outflow pipe leading from which is made long enough to extend to the base of the first receiving vessel. The condensed nitric acid collects here and forms a liquid-seal. The uncondensed gases following are forced to pass through the nitric acid and escape with the gaseous impurities $NO_2$, HCl, etc. and pass into a second and a third receptacle in order to be treated there in the same manner. The nitric acid so obtained is free from lower oxids of nitrogen and chlorin compounds. The latter are caught by suitable receivers, and rendered innocuous to the air pump.

In the drawing is shown by way of example one suitable construction of apparatus for carrying the process into effect.

As shown, 1 is the retort: 2 is a plate with a small opening for producing the difference of pressure between the retort and the receiver: 3 is the connection to the cooling coil 4 contained in a suitable cooling vessel. At the end of the cooling coil issuing from the cooling vessel is connected a glass tube 5 connected to a delivery tube which extends almost to the bottom of the first receiving vessel 6 whereby the distilled nitric acid forms a liquid seal 8. 9 is connecting pipe to the next receiving vessel.

10 is a three-way cock which provides a connection of the cooling coil 4 either with the first receiving vessel 6 or with a tube 11 leading to the next receiving vessel.

12 is a suction pipe by means of which the air is withdrawn from the receiving vessel 6 to maintain the required vacuum.

It will be seen that the action of the hot gases flowing into the vessel 6 and issuing through the pipe 9 will itself produce the purification of the condensed acid in the vessel 6, and the condensed acid remains pure since the impurities do not return to the receiving vessel.

Having described my invention what I claim and desire to secure by Letters Patent of the United States is:—

1. The herein-described process of producing highly concentrated nitric acid in a very short time, which consists in creating an excess of pressure in a retort containing sodium nitrate and sulfuric acid by throttling the nitric acid gases passing from the retort, maintaining a partial vacuum in the condenser, and purifying the collecting condensate by forcing therethrough the following uncondensed nitric acid gases.

2. The process of rapidly obtaining highly concentrated nitric acid, which consists in subjecting in a retort sodium nitrate to the action of sulfuric acid, throttling the escape of the evolved gases to the condenser, condensing the nitric acid gases, and purifying the condensate by passing therethrough the uncondensed gases issuing from the retort.

In testimony whereof I have signed my name to this specification in the presence of two subscribing witnesses.

FRIEDRICH SAMUEL VALENTINER.

Witnesses:
RUDOLPH FRICKE,
SOUTHARD P. WARNER.